3,475,368
PLASTICIZED NYLON COMPOSITION AND
PROCESS FOR MAKING THE SAME
Edward A. Metz, Warminster, Pa., assignor, by mesne assignments, to Nypel of Delaware, Inc., Wilmington, Del., a corporation of Delaware
No Drawing. Filed Mar. 9, 1966, Ser. No. 532,879
Int. Cl. C08g 51/34, 41/02
U.S. Cl. 260—33.4
1 Claim

ABSTRACT OF THE DISCLOSURE

A plasticized homopolyamide composition consisting essentially of between 60 to 99.75 weight percent of the nylon selected from the group of nylon 6, nylon 66, and nylon 610 and 0.25 to 40 weight percent of 2,2,4-trimethyl-1,3-pentanediol, which is relatively free from deleterious action of water, and whose glass-transition temperature and melting point are substantially the same as the non-plasticized polymer.

---

The present invention is directed to a plasticized nylon composition, and to a process for making the same.

Nylon, and by nylon as used herein is meant to include the long-chain polymeric amides which have recurring amide groups as an integral part of the main polymer chain, and which are capable of being formed into a filament in which the structural elements are oriented in the direction of the axis, including nylon 6, a nylon obtained by polycondensation of caprolactam, nylon 66, a nylon obtained by the condensation of hexamethylene diamine with adipic acid, and nylon 610, a nylon obtained by the condensation of hexamethylene diamine with sebacic acid, is conventionally plasticized with highly polar compounds, such as sulfonamides. These highly polar plasticizing agents are extremely soluble in water. As a result, nylon containing a highly polar plasticizing agent will exhibit diminishing effects due to the loss of the plasticizing system when exposed to water.

Another undesirable property of most plasticized polymer systems are their considerably lower glass-transition temperatures and lower melting points. This is attributed to conventional plasticizer-nylon systems effecting a softening action by the dissolving of the plasticizer in the nylon with the lowering of the nylon's glass-transition temperature.

This invention has as an object the provision of a novel plasticized nylon.

This invention has as a further object the provision of a process for preparing said plasticized nylon.

This invention has as an object the provision of plasticized nylon having superior properties including relative freedom from deleterious action of water on the plasticizer in the plasticized nylon.

This invention has as a still further object the provision of a plasticized nylon whose glass-transition temperature and whose melting point is substantially the same as the non-plasticized polymer.

Other objects will appear hereinafter.

The aforesaid objects are accomplished by the nylon composition of the present invention which consists essentially of from 60 to 99.75 weight percent of a homopolyamide selected from the group consisting of nylon 6, nylon 66, and nylon 610, and from 0.25 to 40 weight percent of 2,2,4-trimethyl-1,3-pentanediol.

The plasticized nylon compositions of the present invention may also include conventional additives including mold-releases, pigments, discoloring preventatives, etc. These conventional nylon additives form no part of the present invention, and may be present in the final polymer to perform the same function which they perform in conventional polymers.

The plasticizer is preferably combined with the nylon by the use of an extruder. The plasticizer and nylon are dry blended in the form of pellets, followed by the extrusion of the mixture. However, if desired, the plasticizer may be melted or added in the liquid state directly to the molten nylon in the extruder.

A preferred plasticizer of the present invention is 2,2,4-trimethyl-1,3-pentanediol, hereinafter referred to as TMPD. In the following examples, the TMPD was dry blended with the nylon (in Table I an injection grade type 6 nylon, and in Table II, an injection grade type 66 nylon). The dry blend of TMPD, in the form of powder or granules, and the nylon, in the form of pellets, were thoroughly tumbled in a dry blender for between thirty to sixty minutes to achieve a uniform blend. The thoroughly mixed blend was then fed to an extruder, which melted both the nylon and the TMPD (melting point range 46–55° C.). The molten mixture was then extruded continuously through a conventional strand or ribbon die, quenched and cut to a suitable particle size for further use as an injection molding compound. The cut material was then dried to a moisture content of less than 0.2 weight percent as recommended for injection molding grades of nylon.

Beyond question, there was ester formation between the nylon and the TMPD. Thus, infrared spectrograms of both the type 6 and type 66 nylon prepared in accordance with the present invention exhibited carbonyl absorption at 5.85 microns. Absorption in this region is characteristic of ester formation. I postulate that this esterification took place between the hydroxyl groups of the TMPD and the carboxylic acid groups of the nylon. In addition, I believe there was some copolymerization taking place during the extrusion.

The following trends in selected physical properties clearly indicate the plasticizing effect of TMPD:

(1) Decrease in tensile strength with increasing TMPD concentrations.

(2) Decrease in flexural modulus with increasing TMPD concentrations.

(3) Decrease in hardness with increasing TMPD concentrations.

(4) Increase in impact strength with increasing TMPD concentrations.

(5) Increase in tensile elongation with increasing TMPD concentrations.

Most plasticized polymer systems exhibit considerably lower glass-transition temperatures and lower melting points, however, these properties are not affected when TMPD is used as the plasticizer. The common plasticizers bring about their softening action by dissolving in the high polymer and lowering its glass transition temperature. Thermograms of both type 6 and type 66 nylons containing 10 percent and 40 percent TMPD produced by differential thermal analysis indicate distinct glass-transition temperatures between 49° C. and 50° C. These transition temperatures are identical to the transition temperatures of the unmodified polymers. The melting point as determined by the ASTM procedure D–789 indicates no change in this property with increasing TMPD content. The melting range of the type 66 nylon containing TMPD in concentrations up to 40 percent was 257° C. to 260° C., and the range for the type 6 nylon containing similar TMPD concentrations was 222° C. to 225° C. Since these thermal properties remain unaffected, the esterification and proposed copolymerization mechanism may be further substantiated.

TABLE I.—TYPE 6 NYLON PLASTICIZED WITH TMPD AS MOLDED CONDITION

| | | | | | | | | | |
|---|---|---|---|---|---|---|---|---|---|
| Nylon, Type 6, percent | 100 | 99.0 | 97.5 | 96.0 | 95.0 | 90.0 | 85.0 | 80.0 | 60.0 |
| TMPD, percent | 0.0 | 1.0 | 2.5 | 4.0 | 5.0 | 10.0 | 15.0 | 20.0 | 40.0 |
| Tensile Strength, p.s.i. | 10,500 | 10,000 | 9,800 | 9,600 | 9,300 | 8,800 | 8,300 | 7,100 | 5,400 |
| Elongation, percent | 130 | 180 | 185 | 190 | 200 | 230 | 280 | 300 | 330 |
| Flexural Modulus, p.s.i. | 450,000 | 424,000 | 358,000 | 271,000 | 250,000 | 157,000 | 134,000 | 86,000 | 21,000 |
| Flexural Strength, p.s.i. | 16,900 | 14,600 | 13,000 | 10,500 | 8,600 | 5,400 | 4,300 | 3,000 | 2,600 |
| Izod Impact, ft. lb./in. | 1.00 | 1.28 | 1.40 | 1.58 | 1.71 | 2.97 | 3.33 | 3.40 | 3.52 |
| Hardness, Rockwell, M | 69 | 65 | 63 | 59 | 55 | 34 | 20 | 0 | |
| Hardness, Rockwell, L | 98 | 92 | 86 | 85 | 82 | 68 | 58 | 38 | 24 |
| Hardness, Rockwell, R | 115 | 112 | 110 | 107 | 102 | 95 | 85 | 75 | 65 |
| Hardness, Durometer, D | 85 | 83 | 82 | 81 | 79 | 75 | 73 | 71 | 69 |
| Heat Distortion, 66 p.s.i., °F | 356 | 353 | 350 | 348 | 346 | 343 | 328 | 308 | 294 |
| Heat Distortion, 264 p.s.i., °F | 155 | 150 | 145 | 140 | 138 | 135 | 133 | 132 | 131 |

TABLE II.—TYPE 66 NYLON PLASTICIZED WITH TMPD AS MOLDED CONDITION

| | | | | | | | | |
|---|---|---|---|---|---|---|---|---|
| Nylon, Type 66, percent | 100 | 99.0 | 97.5 | 95.0 | 90.0 | 85.0 | 80.0 | 60.0 |
| TMPD, percent | 0.0 | 1.0 | 2.5 | 5.0 | 10.0 | 15.0 | 20.0 | 40.0 |
| Tensile Strength, p.s.i. | 11,000 | 10,800 | 10,400 | 10,000 | 9,500 | 9,000 | 8,500 | 7,300 |
| Elongation, percent | 50 | 54 | 60 | 75 | 89 | 100 | 110 | 140 |
| Flexural Modulus, p.s.i. | 480,000 | 450,000 | 425,000 | 376,000 | 289,000 | 253,000 | 225,000 | 148,000 |
| Flexural Strength, p.s.i. | 19,400 | 16,400 | 15,700 | 12,100 | 9,400 | 8,400 | 8,000 | 5,100 |
| Izod Impact, ft. lb./in. | 0.90 | 0.95 | 1.10 | 1.20 | 1.40 | 1.70 | 1.90 | 2.10 |
| Hardness, Rockwell, M | 84 | 80 | 79 | 78 | 66 | 55 | 49 | 33 |
| Hardness, Rockwell, L | 103 | 100 | 95 | 93 | 87 | 83 | 78 | 64 |
| Hardness, Rockwell, R | 118 | 116 | 113 | 111 | 108 | 104 | 101 | 83 |
| Hardness, Durometer, D | 84 | 83 | 83 | 82 | 80 | 78 | 75 | 74 |
| Heat Distortion, 66 p.s.i. °F | 450 | 448 | 445 | 431 | 427 | 425 | 417 | 404 |
| Heat Distortion, 264 p.s.i. °F | 170 | 163 | 155 | 150 | 145 | 143 | 140 | 138 |

The present invention may be embodied in other specific forms without departing from the spirit or essential attributes thereof and, accordingly, reference should be made to the appended claims, rather than to the foregoing specification as indicating the scope of the invention.

I claim:

1. A nylon composition suitable for injection molding consisting essentially of between 60 and 99.75 weight percent of a homopolyamide selected from the group consisting of poly(caprolactam), poly(hexamethylene adipamide), and poly(hexamethylene sebacamide) and 0.25 to 40 weight percent of 2,2,4-trimethyl-1,3-pentanediol.

References Cited

UNITED STATES PATENTS

| | | | |
|---|---|---|---|
| 2,311,587 | 2/1943 | Vaala | 260—33.4 |
| 2,393,972 | 2/1946 | Cairns | 18—54 |
| 2,430,860 | 11/1947 | Cairns | 260—72 |
| 2,615,002 | 10/1952 | Hurwitz | 260—33.4 |
| 2,749,331 | 6/1956 | Breslow | 260—33.4 |
| 3,037,956 | 6/1962 | Kessler. | |
| 3,182,100 | 5/1965 | Bedell | 260—33.4 |

OTHER REFERENCES

Condensed Chemical Dictionary (6th Ed.) (Reinhold) (N.Y.) (1961) pages 819–820.

JAMES A. SEIDLECK, Primary Examiner

H. H. FLETCHER, Assistant Examiner